July 4, 1939.　　　　G. E. MOORE　　　　2,164,883
WHEEL
Filed May 13, 1935　　　　4 Sheets-Sheet 1

FIG. I.

INVENTOR
GEORGE E. MOORE

ATTORNEYS

July 4, 1939. G. E. MOORE 2,164,883
WHEEL
Filed May 13, 1935 4 Sheets-Sheet 2

INVENTOR
GEORGE E. MOORE

ATTORNEYS

July 4, 1939. G. E. MOORE 2,164,883
WHEEL
Filed May 13, 1935 4 Sheets-Sheet 3

INVENTOR
GEORGE E. MOORE
BY
ATTORNEYS

July 4, 1939.   G. E. MOORE   2,164,883
WHEEL
Filed May 13, 1935   4 Sheets-Sheet 4

INVENTOR
GEORGE E. MOORE

BY
ATTORNEYS

Patented July 4, 1939

2,164,883

UNITED STATES PATENT OFFICE 2,164,883

WHEEL

George E. Moore, Dearborn, Mich., assignor to Kelsey-Hayes Wheel Company, Detroit, Mich., a corporation of Delaware Application May 13, 1935, Serial No. 21,240

15 Claims. (Cl. 301—6)

The invention relates to wheels and refers more particularly to motor vehicle wheels of that type in which the wheel body for carrying the rim and the brake drum are secured to each other.

The invention has for some of its objects to secure the wheel body and brake drum to each other in a manner to decrease the possibility of distortion of the brake drum by the wheel body during the operation of the wheel; to make the wheel so that the brake drum and more particularly its web transmits the wheel load and to yieldably mount the wheel body upon the brake drum; to reinforce the brake drum and to mount the wheel body upon the reinforcement; and to form the reinforcement with flexible means for mounting the wheel body.

The invention has for other objects to provide a reinforcement at the junction of the annular brake flange and the web portion of the brake drum so arranged that the reinforcement may be readily positioned in a mold and the brake flange or web portion may be cast thereon; and to construct the reinforcement with a brake feeler gauge opening which may be utilized to position the wheel reinforcement in the mold.

With these and other objects in view, the invention resides in the novel features of construction and arrangement and combinations of parts as more fully hereinafter set forth.

In the drawings:

Figure 1 is an elevation, partly broken away, of a wheel showing an embodiment of my invention;

Figure 2:
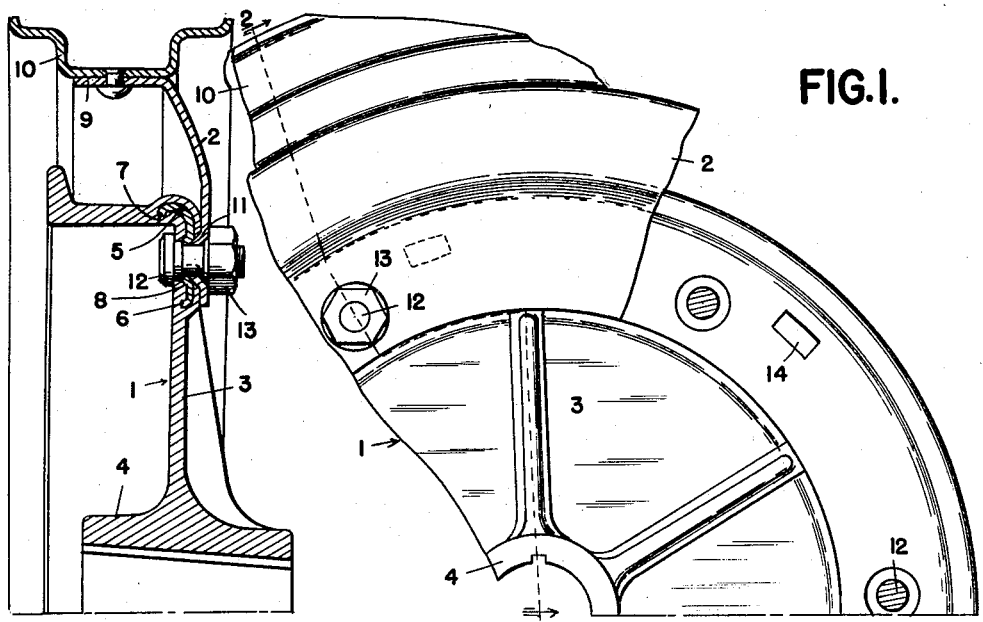
Figure 2 is a cross section on the line 2—2 of Figure 1.

Referring to Figures 1 and 2, 1 is the brake drum and 2 the wheel body. The brake drum 10 comprises a cast element having the integral annular brake flange 3' and web 3 and this element is cast integrally with the hub 4 in the present instance. 5 is an annular sheet metal reinforcement at the junction of the brake flange and web and imbedded therein. This reinforcement is preferably heated before casting, so that it is effectively bonded or fused to the brake flange and web. As shown, the reinforcement has the inner and outer flanges 6 and 7 respectively, the inner flange being in the web and the outer flange being in the brake flange. This reinforcement also has formed in its web the angularly spaced frusto-conical portions 8 having openings therethrough registering with openings formed in the web 3. The axially outer portions of the openings formed in the web 3 are also frusto-conical and are in continuation of the axially outer faces of the frusto-conical portions 8.

The wheel body 2, as shown, is formed of sheet metal and it may be of any desired disk or spoke formation. This wheel body is provided with the peripheral flange 9 to which the tire carrying rim 10 is secured. The wheel body is also provided with the annular series of frusto-conical projections 11 which are adapted to fit the axially outer faces of the projections 8 and the adjacent portions of the web 3. The wheel body is demountable and, as shown, is detachably secured to the brake drum by the bolts 12 and the nuts 13.

In the present instance the brake drum is also provided with the openings 14 which extend through the web 3 and the web of the reinforcement 5 and which are adapted for insertion therethrough of a brake feeler gauge.

Figure 3:
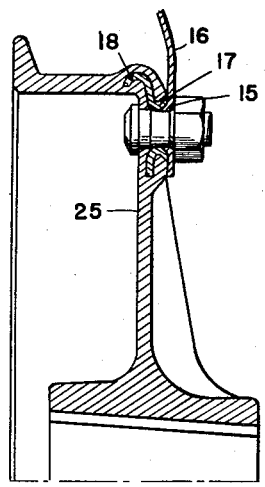
Figure 3 is a view similar to Figure 2, showing another embodiment of my invention.

The wheel shown in Figure 3 differs essentially from that shown in Figures 1 and 2, in that the frusto-conical projections 15 of the wheel body 16 directly engage only the frusto-conical projections 17 of the reinforcement 18. In this instance the frusto-conical projections 17 extend axially outwardly from the web of the reinforcement.

Figures 5, 6:
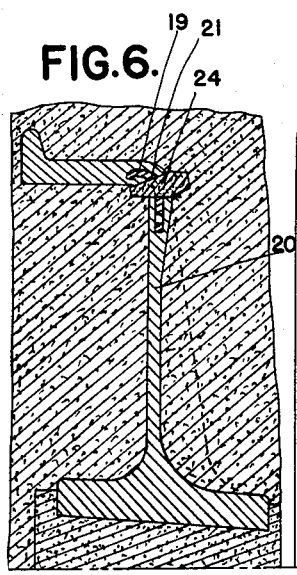
Figure 5 is a cross section on the line 5—5 of Figure 4.
Figure 6 is a section showing the method of molding.
Figure 4:
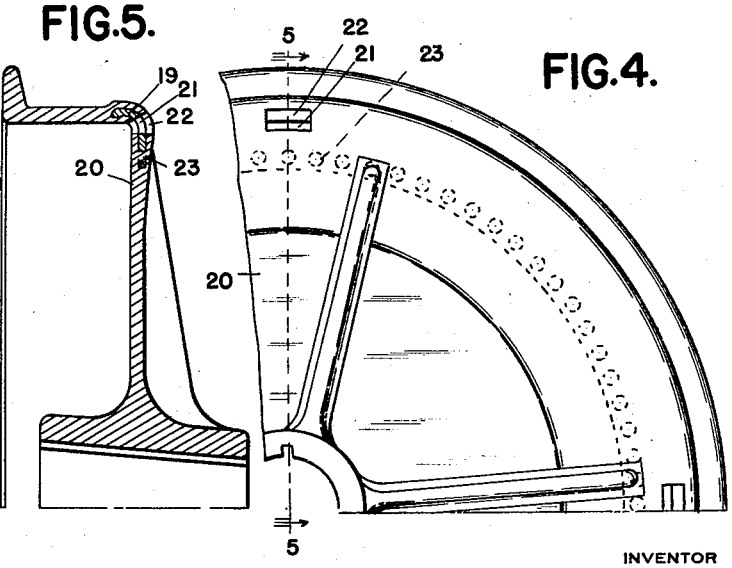
Figure 4 is an elevation showing another embodiment of my invention.

Figures 4, 5 and 6 disclose another modification in which the sheet metal reinforcement 19 and the cast web 20 are formed with the registering openings 21 and 22 for insertion therethrough of a brake feeler gauge. The reinforcement is also formed with the angularly spaced openings 23 in its inner portion through which the metal of the web extends to assist in more effectively securing the reinforcement.

As illustrated particularly in Figure 6, the openings 21 are flared and engaged by flared portions of the cores 24 which are positioned in the mold sections. By reason of the flared portions of the cores, the reinforcement may be supported in spaced relation to the surfaces of the mold cavity. It is apparent that these cores also form the openings 22.

It is also apparent that the reinforcements 5 and 18 of Figures 1 and 2 and Figure 3, respectively, may also be properly positioned in molds by cores having flared portions fitting the frusto-conical projections 8 and 17. It is also apparent that these cores will form the openings in the webs which register with the openings through these frusto-conical projections. In addition, the brake feeler gauge openings in the reinforcements may also be utilized in positioning the reinforcements in the molds.

Figure 8:
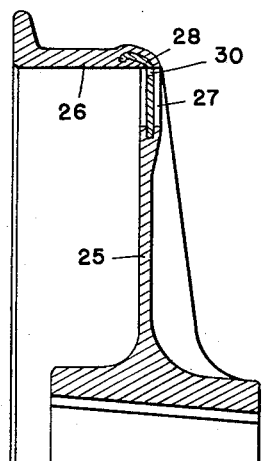
Figure 8 is a cross section on the line 8—8 of Figure 7.
Figure 7:
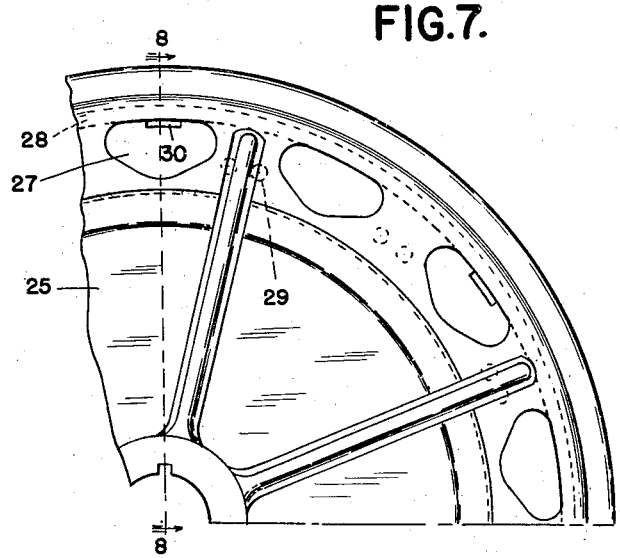
Figure 7 is an elevation showing another embodiment of my invention.

As illustrated in Figures 7 and 8, the web 25 which is cast integral with the annular brake flange 26 is provided with the angularly spaced openings 27 near the brake flange and the annular sheet metal reinforcement 28 has its inner and outer edges respectively imbedded in and anchored to the web and the brake flange, the portions of this reinforcement between the openings 27 being also imbedded in the web and being preferably provided with the openings 29 filled by the metal of the web. The reinforcement extends across the openings 27 and is provided with the openings 30 so that a brake feeler gauge may be inserted through the openings 30 and associated openings 27. It will be noted that in this construction the reinforcement may be positioned in the mold by means engaging the exposed portions of the reinforcement, this means also serving to form the openings 27.

Figure 10:
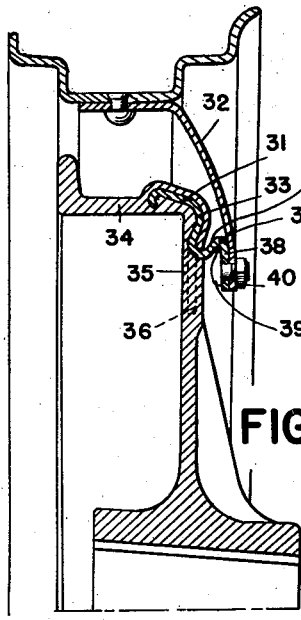
Figure 10 is a cross section on the line 10—10 of Figure 9.
Figure 9:
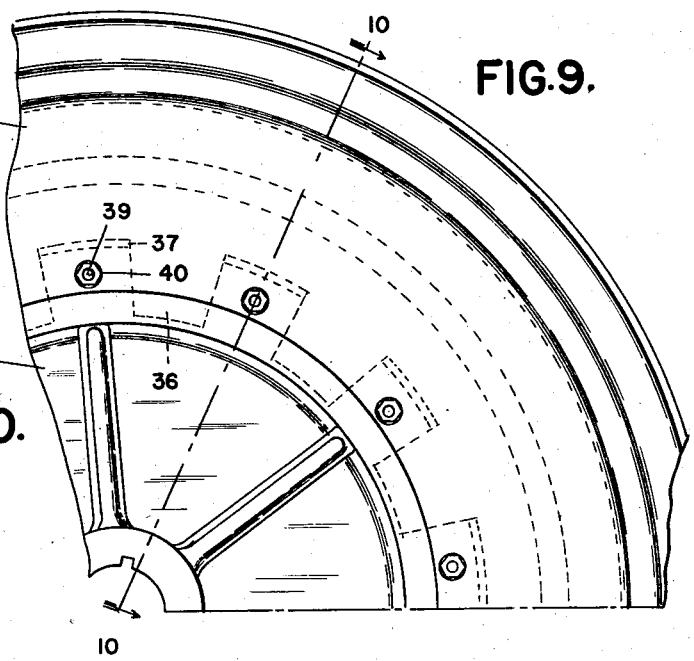
Figure 9 is an elevation showing another embodiment of my invention.

Figures 9 and 10 illustrate another modification in which the sheet metal reinforcement 31 is provided with a yieldable portion to which the wheel body 32 may be secured. More in detail, the reinforcement has the annular portion 33 which is imbedded in and anchored to the brake flange 34 and the web 35, the radial tongues 36 which are anchored in the web 35, and the flexible resilient tongues 37 which extend axially outwardly from the web 35. The roots of these tongues 37 are located intermediate the roots of the tongues 36. The tongues 37 have the radially extending portions 38 to which the wheel body is suitably secured as by means of the bolts 39 and the nuts 40. The tongues also have the curved portions 41 connecting into the portions 38 and providing for flexibility, especially in an axial direction.

Figure 11:
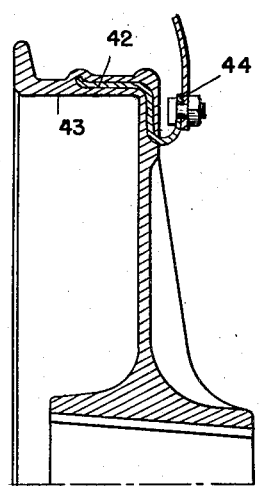
Figure 11 is a view similar to Figure 10 showing another embodiment of my invention.

The structure shown in Figure 11 differs essentially in that the sheet metal reinforcement 42 extends through a greater extent of the annular brake flange 43 and in that the flexible resilient tongues 44 extend radially outwardly. These tongues furthermore are of progressively increasing thickness from their ends to their zones of mergence into the annular portion.

Figure 13:
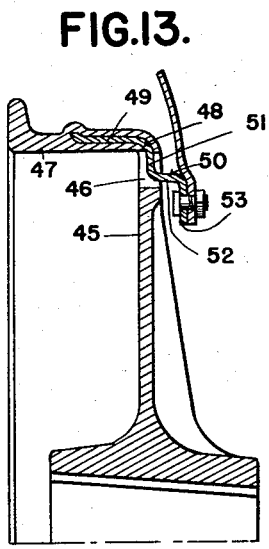
Figure 13 is a cross section on the line 13—13 of Figure 12.
Figure 12:
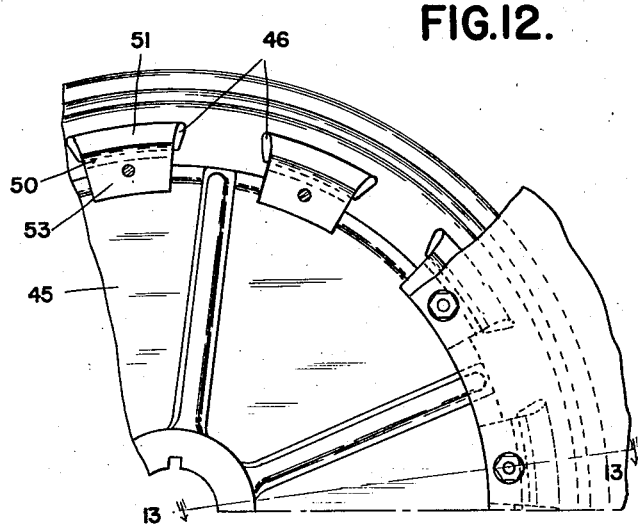
Figure 12 is an elevation showing another embodiment of my invention.

Figures 12 and 13 disclose a construction in which the web 45 of the brake drum is provided with the angularly spaced openings 46 adjacent the annular brake flange 47. The annular sheet metal reinforcement 48 has the annular portion 49 which is imbedded in the brake flange 47 and the generally radially inwardly extending tongues 50 which extend from the annular portion 49 into the openings 46 and then axially outwardly therefrom. More specifically, these resilient tongues 50 have the radially extending portions 51 leading from the annular portion 49, the axially outwardly extending portions 52 leading from the portions 51, and the radially inwardly extending portions 53 leading from the portions 52. The wheel body is adapted to be secured against these portions 53.

Figure 15:
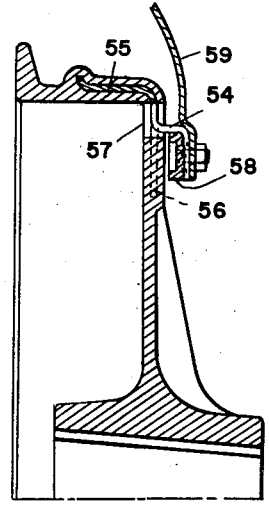
Figure 15 is a cross section on the line 15—15 of Figure 14.
Figure 14:
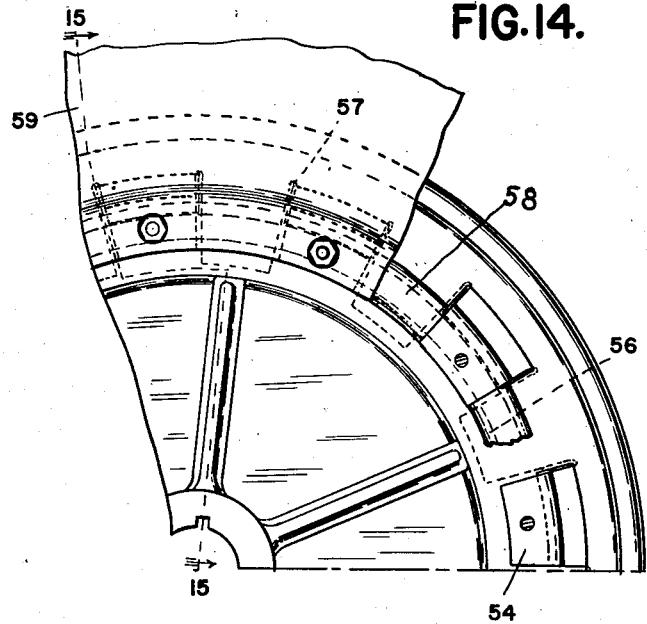
Figure 14 is an elevation showing another embodiment of my invention.

The structure shown in Figures 14 and 15 differs essentially from that shown in Figures 12 and 13, in that the resilient tongues 54 progressively decrease in thickness from their zones of mergence with the annular portion 55 of the reinforcement to their free ends. Also the reinforcement is provided intermediate the tongues 54 with the tongues 56 which are imbedded in the web between its openings 57. Furthermore, the reinforcing ring 58 is preferably provided, this ring being permanently secured to the free ends of the tongues 54 as by welding and serving to reinforce the resilient tongues and distribute the stresses to which they are subjected through the wheel body 59. This ring is preferably channel-shaped and the heads of the securing bolts preferably nest within the channel.

Figure 16:
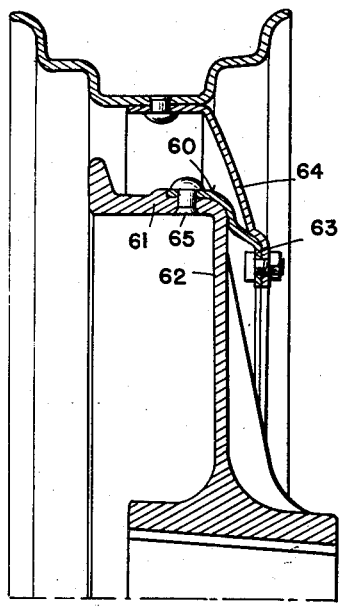
Figure 16 is a view similar to Figure 15 showing another embodiment of my invention.

In the modification shown in Figure 16 the sheet metal reinforcement 60 is located at the radially outer side of the annular brake flange 61 and the outer edge portion of the axially outer side of the web 62. This reinforcement is also provided with the flexible resilient tongues 63 to which the wheel body 64 is secured. The annular portion of the reinforcement is preferably fused to the cast element during the molding operation and furthermore the annular portion and the brake flange may be secured together by means of the rivets 65.

It will be seen that in all of these modifications the sheet metal reinforcement is located at the junction of the web and brake flange of the cast element of the brake drum and that in all instances the reinforcement has exposed portions or surfaces which may be utilized in positioning the reinforcements in the molds. It will be further seen that the constructions are such that the reinforcements may be molecularly bonded or fused to the cast elements. It will be further seen that the reinforcements may be made to serve in mounting the wheel bodies upon the brake drums and that they may have resilient portions which are flexible, especially in axial directions, and which serve as mountings for the wheel bodies.

What I claim as my invention is:

1. In a wheel, a brake drum comprising an element having an integral flange and web portion, and a reinforcing element embedded in said first mentioned element, and a wheel body mounted on said reinforcing element.

2. In a wheel, a brake drum comprising an element having an integral flange and web portion, a reinforcing element embedded in the brake drum at the junction of said flange and web portion having an exposed portion, and a wheel body mounted on said exposed portion.

3. In a wheel, a brake drum comprising an element having an integral flange and web portion and a reinforcing element for said first mentioned element having an annular portion secured to said first mentioned element and resilient tongues, and a wheel body mounted on said tongues.

4. In a wheel, a brake drum and a reinforcement therefor, said drum and reinforcement having registering openings for insertion of a brake feeler gauge therethrough, said reinforcement having the edges bounding its openings exposed and a wheel body element mounted on the reinforcement.

5. In a wheel, a brake drum comprising an element having an integral flange and web portion, a reinforcing element having a portion imbedded in said first mentioned element and a flexible portion, and a wheel body mounted on said flexible portion.

6. In a wheel, a brake drum comprising a cast element having an integral brake flange and web portion, a sheet metal reinforcing element at the junction of said flange and web portion having its surface fixed to said cast element, and flexible tongues, and a wheel body mounted on said flexible tongues.

7. In a wheel, a brake drum comprising an element having an integral brake flange and web portion and a reinforcing element, said web portion having openings near said flange and said reinforcing element having an annular portion anchored to said first mentioned element, and flexible tongues extending outwardly through said openings, and a wheel body mounted on said tongues.

8. In a wheel, a brake drum comprising an element having an integral brake flange and web portion, and a reinforcing element having an annular portion anchored to said first mentioned element, and axially flexible tongues, and a wheel body mounted on said tongues.

9. In a wheel, a cast brake drum having core openings, a reinforcement cast in the drum and having openings registering with the core openings, the openings aforesaid being of sufficient dimension to provide for insertion of a brake feeler gauge therethrough, and the reinforcement being predeterminedly positioned with reference to the drum to insure registration of the aforesaid openings by cooperation of the openings in the reinforcement with the cores for forming the openings in the drum.

10. In a wheel, a brake drum comprising a cast element having an integral brake flange and web portion, a sheet metal reinforcing element embedded in the brake drum at the junction of said flange and web portion and having circumferentially spaced portions exposed through correspondingly spaced openings in the web portion, and a wheel body element secured to said exposed portions.

11. In a wheel, a brake drum comprising a brake flange and a web, a wheel body, and means for mounting said wheel body on said brake drum at a point spaced from said brake flange, said means comprising a resilient member on which said brake flange and web are cast and extending to the zone of connection of said wheel body and said means.

12. In a wheel, a brake drum comprising a resilient member, a brake flange and a web, and a wheel body mounted on said resilient member, said brake flange and web being cast on said resilient member in a zone spaced from the zone of connection of said wheel body and said resilient member, the latter having a resilient portion adjacent the zone of connection to decrease liability of distortion of said brake flange by said wheel body.

13. In a wheel, a brake drum comprising a cast element having a brake flange and a web portion, a sheet metal element embedded in the drum at the junction of said flange and web portion and having circumferentially spaced flexible portions projecting axially outwardly from the web portion of the drum, and a wheel body mounted on said flexible portions.

14. In a wheel, a brake drum comprising a cast brake flange and a cast web portion, a sheet metal element having portions embedded in said brake flange and web portion and having a flexible portion projecting outwardly and spaced from said brake flange and web portion, and a wheel body carried by said flexible portion.

15. In a wheel, a brake drum comprising a cast element having an integral flange and web portion and a sheet metal reinforcing element embedded in the brake drum, a wheel body, said reinforcing element and wheel body having cooperating recesses and projecting portions, and means for securing said reinforcing element and wheel body together.

GEORGE E. MOORE.